May 8, 1923.

J. ROBERTSON, JR 1,454,655

MOLD FOR FORMING REPAIR PATCHES

Filed Feb. 15, 1922

Inventor,
James Robertson, Jr.,
By Samuel W. Balch
Attorney

May 8, 1923.
J. ROBERTSON, JR
1,454,655
MOLD FOR FORMING REPAIR PATCHES
Filed Feb. 15, 1922
3 Sheets-Sheet 2
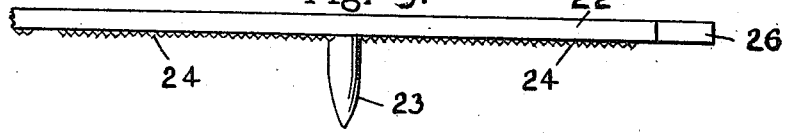
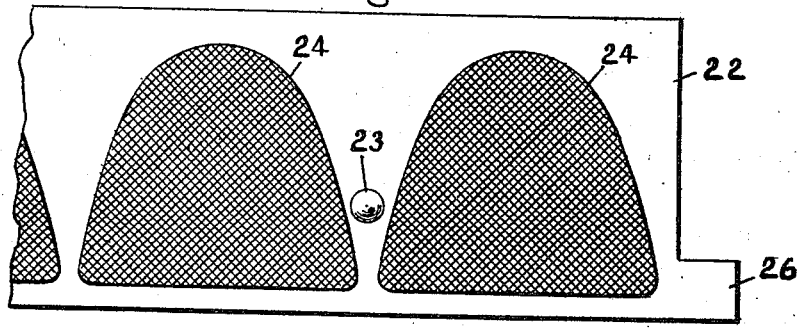
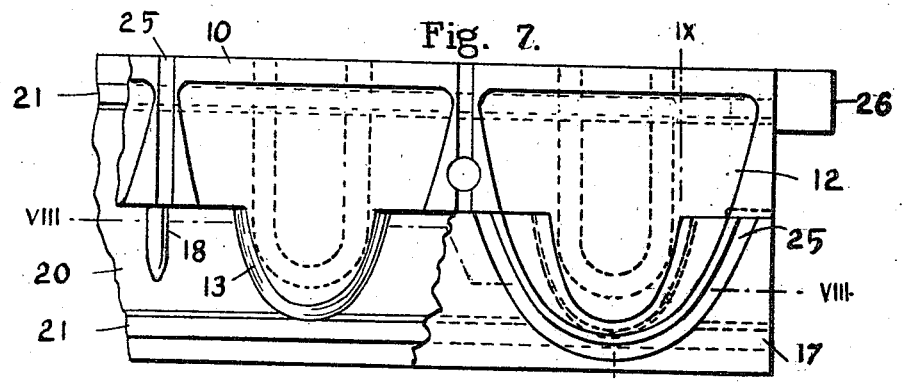
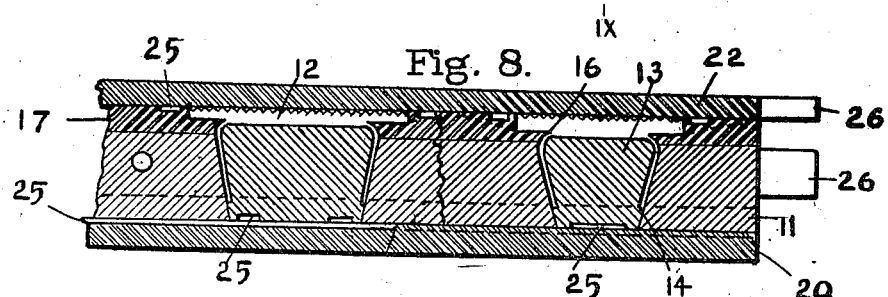
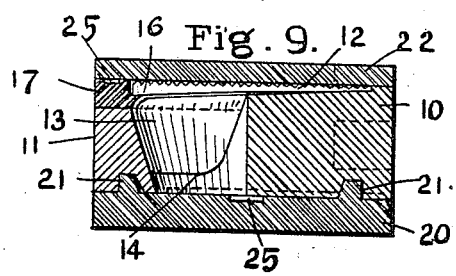
Inventor,
James Robertson, Jr.,
By Samuel W. Balch
Attorney.

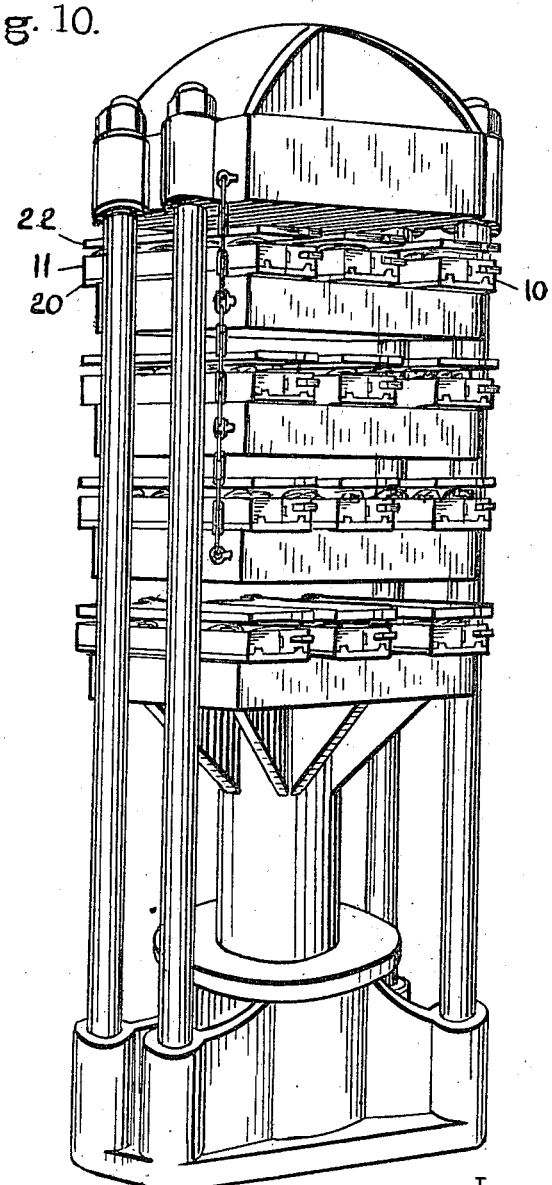

Patented May 8, 1923.

1,454,655

UNITED STATES PATENT OFFICE.

JAMES ROBERTSON, JR., OF WEEHAWKEN, NEW JERSEY.

MOLD FOR FORMING REPAIR PATCHES.

Application filed February 15, 1922. Serial No. 536,689.

*To all whom it may concern:*

Be it known that I, JAMES ROBERTSON, Jr., a citizen of the United States of America, and a resident of Weehawken, in the county of Hudson and State of New Jersey, have invented certain new and useful Improvements in Molds for Forming Repair Patches, of which the following is a specification.

The object of this invention is to provide a mold suitable for forming rubber repair patches for the heel or toe of rubber footwear such as is set forth in my Reissue Patent No. 15,201 granted September 20, 1921. The repair patch has a tread portion and a flexible and elastic flange upstanding from one side of the tread portion. The flange is of one piece with the tread portion, is thin at the line of juncture with the tread portion, and it joins to the tread portion in such manner as to make a sharp corner particularly on its outer or convex side. A further object is to provide a mold of such form that it can be used so that the plastic rubber will be sufficiently forced into the portion where the flange is molded as well as throughout the portion where the tread is molded whereby a complete and perfect article is insured. A further object is to provide a mold of such form and in which the joints are so disposed that the fins from the molded article in the joints will not interfere with the ready separation of the mold parts, and the fins will be so disposed that they can be readily trimmed away without disfiguring the article.

In the accompanying three sheets of drawings, which form a part of this specification, the several parts of a mold embodying this invention are illustrated, in which—

Figs. 5 and 6 are respectively edge and under views of the top plate broken away.

Fig. 7 is a plan of the laterally separable parts and the bottom plate assembled and broken away.

Fig. 8 is a vertical section through the assembled mold on the line VIII—VIII of Fig. 7.

Fig. 9 is a vertical section through the assembled mold on line IX—IX of Fig. 7.

Fig. 10 is a perspective of a hydraulic steam plate press with molds charged with plastic rubber.

Figure 1:
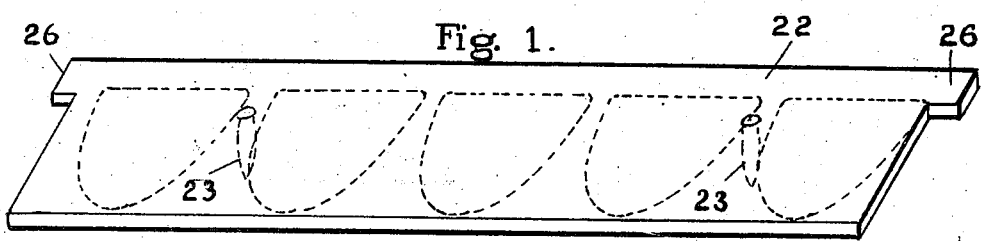
Figure 1 is a perspective of the top plate.
Figure 2:
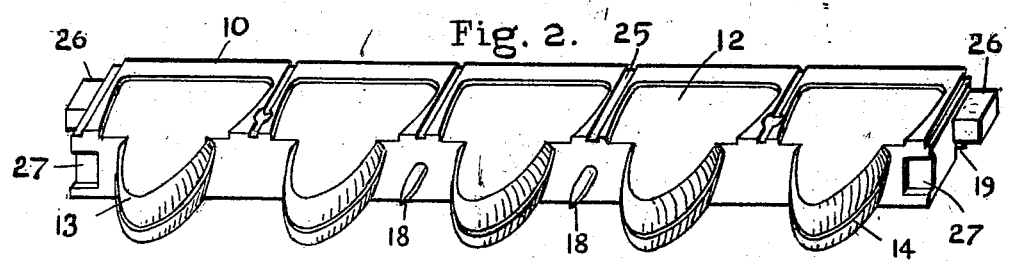
Figs. 2 and 3 are perspectives of the laterally separable parts of the mold.
Figure 3:
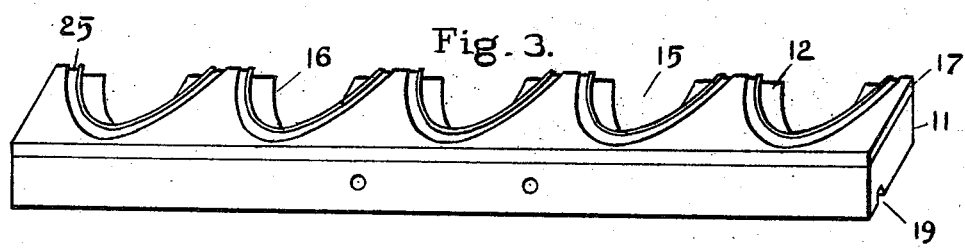
Figure 4:
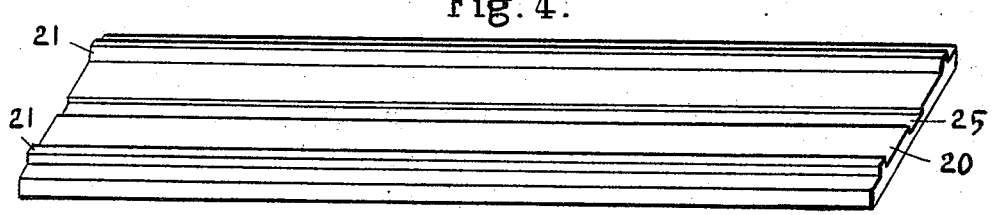
Fig. 4 is a perspective of the bottom plate.

The mold lies partly in each of two laterally separable parts 10, 11 which are in the form of bars and it is preferably repeated a number of times along the length of the bars. When the parts are together a recess 12 is formed for each mold which lies partly in the top face of each bar. This recess corresponds in outline and depth to the tread of the repair patch. Along the side of one of the laterally separable parts is a projection 13 for each mold. This projection underlies the recess for the tread of the repair patch and is convex in both vertical and horizontal section. Along the lower edge of this projection is a shoulder 14 which defines the margin of the upstanding flange of the repair patch. On the opposing face of the other of the laterally separable parts is a recess 15 for each mold. This recess underlies the recess for the tread of the repair patch and is concave in both vertical and horizontal section. Its wall meets the under wall of the recess for the tread at a sharp edge 16 and the portion of the mold which carries this edge is of a durable material as steel which is capable of holding the edge and not chipping. It is conveniently provided by a steel facing 17 for the upper part of the one of the laterally separable parts which carries the edge. Other parts of the mold are conveniently of a more easily machined material as cast iron or aluminum. The laterally separable parts when brought together are properly positioned with respect to each other by dowel pins 18, 18, and the parts have longitudinal grooves 19, 19 in their under sides so that when placed on a bottom plate 20 with longitudinal ribs 21, 21, the ribs will engage the grooves and keep the laterally separable parts from being forced apart by the pressure of the material in the molds. A top plate 22, 22 is laid over the laterally separable parts to complete the mold and is positioned by dowels 23, 23. Portions 24, 24 of the under face which come opposite the recesses for the tread portions in the molds each have two intersecting series of parallel grooves cut therein thereby leaving projecting points so that a roughened face will be molded on the tread portion of each repair patch. Overflow grooves 25, 25 adjoin the joints of the molds to receive any excess material over what is needed for the article and which forms the slight fins in the joints. Spaced tongues 26, 26 and recesses 27, 27, are provided to enable the parts to be more readily separated by the insertion of a tool between or into them.

In molding the repair patches all parts of the mold are suitably lubricated, the laterally separable parts are brought together and laid on the bottom plate and a sufficient mass of plastic rubber composition is placed in the recess for molding each tread portion. The top plate is then laid on but does not close fully on account of the underlying masses of plastic rubber. The charged molds are then placed between the jaws of a steam-plate press and while all of the parts are brought to a proper temperature a sufficient pressure is applied to close the molds and force any excess of material in each mold through the joints and into the overflow grooves, and the molds are held in press for a sufficient time to effect the vulcanization.

I claim—

1. A mold for a rubber repair patch with a tread portion and an upstanding flange, the mold comprising laterally separable parts having a recess corresponding in form to the tread and lying partly in the top face of each of the laterally separable parts, one of the laterally separable parts having a convex projection and the other having a concave recess and having its face meeting the bottom of the recess in the top face at a sharp edge, the projection and recess being spaced apart by the amount required for the upstanding flange, means for holding together the laterally separable parts, and a top plate through which pressure is applied for forcing material throughout the mold, substantially as described.

2. A mold for a rubber repair patch with a tread portion and an upstanding flange, the mold comprising laterally separable parts of easily machined material, one of the separable parts having a convex projection and the other having a concave recess the face of which terminates at its upper margin in a sharp edge, the portion which forms the sharp edge being formed of material capable of holding an edge, the projection and recess being spaced apart to correspond in form to the upstanding flange, means for holding together the laterally separable parts, and a top plate cooperating with the laterally separable parts to form a recess for the tread in such manner that pressure may be applied through the top plate for forcing material throughout the mold, substantially as described.

3. A mold for a rubber repair patch with a tread portion and an upstanding flange, the mold comprising laterally separable parts, one of the separable parts having a convex projection with a shoulder near the bottom thereof, and the other having a concave recess, the projection and recess being spaced apart to correspond in form to the upstanding flange and the shoulder defining the margin of the flange, means for holding together the laterally separable parts, and a top plate cooperating with the laterally separable parts to form a recess for the tread in such manner that pressure may be applied through the top plate for forcing material throughout the mold, substantially as described.

4. A mold for a rubber repair patch with a tread portion and an upstanding flange, the mold comprising laterally separable parts having a recess corresponding in form to the tread and lying partly in the top face of each of the laterally separable parts, one of the laterally separable parts having a projection convex in both vertical and horizontal sections and the other having a recess concave in both vertical and horizontal sections and having its face meeting the bottom of the recess in the top face at a sharp edge, the projection and recess being spaced apart by the amount required for the upstanding flange, a bottom plate, engaging means between the bottom plate and each of the laterally separable parts, and a top plate through which pressure is applied for forcing material throughout the mold, substantially as described.

5. A mold for a rubber repair patch with a tread portion and an upstanding flange, the mold comprising laterally separable parts of easily machined material, one of the separable parts having a projection convex in both vertical and horizontal sections and the other having a recess concave in both vertical and horizontal sections the face of which terminates at its upper margin in a sharp edge, the portion which forms the sharp edge being formed of material capable of holding an edge, the projection and recess being spaced apart to correspond in form to the upstanding flange, a bottom plate, engaging means between the bottom plate and each of the laterally separable parts, and a top plate cooperating with the laterally separable parts to form a recess for the tread in such manner that pressure may be applied through the top plate for forcing material throughout the mold, substantially as described.

6. A mold for a rubber repair patch with a tread portion and an upstanding flange, the mold comprising laterally separable parts, one of the separable parts having a convex projection with a shoulder near the bottom thereof and the other having a concave recess, the projection and recess being spaced apart to correspond in form to the upstanding flange and the shoulder defining the margin of the flange, a bottom plate, engaging means between the bottom plate and each of the laterally separable parts, and a top plate cooperating with the laterally separable parts to form a recess for the tread in such manner that pressure may be applied through the top plate for forcing material throughout the mold, substantially as described.

JAMES ROBERTSON, Jr.